United States Patent
Lee et al.

(10) Patent No.: US 10,785,054 B2
(45) Date of Patent: Sep. 22, 2020

(54) SLAVE MODULE

(71) Applicant: Samsung SDI Co., Ltd., Yongin-si, Gyeonggi-do (KR)

(72) Inventors: Youngjin Lee, Yongin-si (KR); Jaewoo Kam, Yongin-si (KR); Gilchoun Yeom, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/674,584

(22) Filed: Nov. 5, 2019

(65) Prior Publication Data

US 2020/0145250 A1    May 7, 2020

(30) Foreign Application Priority Data

Nov. 6, 2018  (KR) .................. 10-2018-0135338

(51) Int. Cl.
*G06F 15/173* (2006.01)
*H04L 12/403* (2006.01)
*G05B 19/042* (2006.01)
*H02J 13/00* (2006.01)
(Continued)

(52) U.S. Cl.
CPC ........ *H04L 12/403* (2013.01); *G05B 19/0421* (2013.01); *H02J 7/0021* (2013.01); *H02J 13/0003* (2013.01); *H05B 47/185* (2020.01); *G05B 2219/2231* (2013.01)

(58) Field of Classification Search
CPC . H04L 12/403; H05B 47/185; G05B 19/0421; H02J 7/0021; H02J 13/0003
See application file for complete search history.

(56) References Cited

U.S. PATENT DOCUMENTS

| 4,614,945 A | * | 9/1986 | Brunius | ................. G01D 4/006 340/505 |
| 7,844,505 B1 | * | 11/2010 | Arneson | .............. G06Q 10/087 340/10.2 |
| 10,243,923 B2 | | 3/2019 | Jo | |

(Continued)

FOREIGN PATENT DOCUMENTS

| KR | 10-2015-0033188 A | 4/2015 |
| KR | 10-2016-0041260 A | 4/2016 |

(Continued)

*Primary Examiner* — Thanh T Nguyen
(74) *Attorney, Agent, or Firm* — Lewis Roca Rothegerber Christie LLP (57) ABSTRACT

A slave module receives a first wake-up signal from an adjacent previous module to perform a wake-up operation and to transmit a second wake-up signal to an adjacent subsequent module. The slave module includes: an analog front end (AFE) including a first terminal and a second terminal, the AFE may be woken up by receiving the first wake-up signal through the first terminal and may output a first voltage through the second terminal in a woken up state; a processor including a third terminal electrically connected to the first terminal, a fourth terminal electrically connected to the second terminal, and a fifth terminal electrically connected to a second slave terminal. The processor may boot up when the first voltage is applied to the fourth terminal, may output a second voltage to the third terminal after being booted up, and may output the second wake-up signal to the fifth terminal.

16 Claims, 3 Drawing Sheets

(51) Int. Cl.
    *H02J 7/00*           (2006.01)
    *H05B 47/185*       (2020.01)

(56) References Cited

U.S. PATENT DOCUMENTS

| | | | |
|---|---|---|---|
| 10,349,353 B2* | 7/2019 | Hu | H04W 76/10 |
| 2007/0049338 A1* | 3/2007 | He | H04M 1/0256 |
| | | | 455/557 |
| 2012/0077441 A1* | 3/2012 | Howard | G08B 21/0272 |
| | | | 455/41.2 |
| 2013/0219204 A1* | 8/2013 | Chen | H04M 1/738 |
| | | | 713/323 |
| 2015/0084598 A1 | 3/2015 | Song | |
| 2015/0286846 A1* | 10/2015 | Prakash | G01R 22/066 |
| | | | 726/34 |
| 2017/0065864 A1* | 3/2017 | Galli | G07C 1/22 |
| 2017/0065871 A1* | 3/2017 | Galli | G07C 1/22 |
| 2018/0124704 A1* | 5/2018 | Jung | H04W 52/0229 |

FOREIGN PATENT DOCUMENTS

| | | |
|---|---|---|
| KR | 10-2017-0051071 A | 5/2017 |
| KR | 10-2017-0122367 A | 11/2017 |

* cited by examiner

SLAVE MODULE

CROSS-REFERENCE TO RELATED APPLICATION

This application claims priority to and the benefit of Korean Patent Application No. 10-2018-0135338, filed on Nov. 6, 2018 in the Korean Intellectual Property Office (KIPO), the content of which is incorporated herein in its entirety by reference.

BACKGROUND

1. Field

One or more embodiments relate to a slave module of a battery module system, and more particularly, to a slave module that receives a first wake-up signal from an adjacent previous module to perform a wake-up operation and that transmits a second wake-up signal to an adjacent subsequent module.

2. Description of the Related Art

A high-capacity battery system may be mounted on an energy storage device or an electricity-powered vehicle such as an electric vehicle. The high capacity battery system may include a high-capacity battery pack to increase the charge capacity thereof.

In general, the high-capacity battery pack may include a plurality of cells, each cell may be monitored by slave modules that manage the cell, and the entire high-capacity battery pack may be managed by a master module that manages the slave modules that manage each cell.

The master module may allocate an identification number for managing a plurality of slave modules and provide data based on the allocated identification number.

SUMMARY

Aspects of one or more embodiments are directed to a battery system including a plurality of slave modules, wherein all of the slave modules may be woken up by the wake-up signal propagation between the slave modules.

For example, a first wake-up signal may be received from an adjacent previous module to perform a wake-up operation and a second wake-up signal may be transmitted to an adjacent subsequent module to wake up all of the slave modules.

Additional aspects will be set forth in part in the description which follows and, in part, will be apparent from the description, or may be learned by practice of the presented embodiments.

According to one or more embodiments, a slave module configured to receive a first wake-up signal from an adjacent previous module to perform a wake-up operation and to transmit a second wake-up signal to an adjacent subsequent module, includes: an analog front end (AFE) including a first terminal and a second terminal, the AFE being configured to be woken up by receiving the first wake-up signal through the first terminal, and to output a first voltage through the second terminal in a woken up state; a processor including a third terminal electrically connected to the first terminal, a fourth terminal electrically connected to the second terminal, and a fifth terminal electrically connected to a second slave terminal, the processor being configured to boot up when the first voltage is applied to the fourth terminal, to output a second voltage to the third terminal after being booted up, and to output the second wake-up signal to the fifth terminal; a first slave terminal connecting the adjacent previous module to the slave module; a second slave terminal connecting the adjacent subsequent module to the slave module; a first communication line connecting the first slave terminal to the AFE and being configured to transmit the first wake-up signal received from the adjacent previous module to the AFE; and a third communication line connecting the second slave terminal to the processor and configured to transmit the second wake-up signal generated by the processor to the adjacent subsequent module through the second slave terminal.

The AFE may maintain the output of the first voltage through the second terminal in the woken up state.

The processor may maintain the output of the second voltage to the third terminal when the first voltage to the fourth terminal is maintained.

The AFE may maintain the woken up state when at least one selected from the first wake-up signal and the second voltage is applied to the first terminal.

The slave module may further include a second communication line configured to transmit a signal generated by the adjacent previous module to the processor or configured to transmit a signal received from the adjacent subsequent module to the adjacent previous module.

The second communication line may include: a (2-1)th communication line configured to transmit the signal generated by the adjacent previous module to the processor; and a (2-2)th communication line configured to transmit the signal received from the adjacent subsequent module to the adjacent previous module.

The slave module may further include a second communication isolator arranged on the second communication line, wherein the second communication isolator may include a high-frequency transformer arranged on the (2-1)th communication line and the (2-2)th communication line.

After being booted, the processor may generate a signal corresponding to booting completion and may transmit the signal to a master module through the second communication line.

The first wake-up signal and the second wake-up signal may include a pulse.

The adjacent previous module may include a master module, and the first wake-up signal may be generated by the master module.

The master module and the slave module may be electrically connected through the first slave terminal by a shielded cable including a shielding layer.

The adjacent subsequent module may include a subsequent slave module, and the processor is configured to generate the second wake-up signal and to transmit the second wake-up signal to the subsequent slave module to wake up the subsequent slave module.

The slave module and the subsequent slave module may be electrically connected through the second slave terminal by a shielded cable including a shielding layer.

The slave module may further include a first communication isolator arranged on the first communication line.

The first communication isolator may include a capacitor arranged on the first communication line.

The slave module may further include a fourth communication line configured to receive a signal from the adjacent subsequent module or to transmit a signal received from the adjacent previous module to the adjacent subsequent module.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept."

It will be understood that when an element or layer is referred to as being "on", "connected to", or "adjacent to" another element or layer, it can be directly on, connected to, or adjacent to the other element or layer, or one or more intervening elements or layers may be present. In contrast, when an element or layer is referred to as being "directly on," "directly connected to", or "immediately adjacent to" another element or layer, there are no intervening elements or layers present.

As used herein, the terms "use," "using," and "used" may be considered synonymous with the terms "utilize," "utilizing," and "utilized," respectively.

The accompanying drawings for illustrating embodiments of the present disclosure are referred to in order to gain a sufficient understanding of the present disclosure, the merits thereof, and the aspects accomplished by the implementation of the present disclosure. However, it should be understood that the present disclosure is not limited to the embodiments described below but may be embodied in various suitable forms and may include all modifications, equivalents, and alternatives falling within the spirit and scope of the present disclosure. The embodiments described below are provided so that the present disclosure will be thorough and complete and will fully convey the scope of the present disclosure to those of ordinary skill in the art. In the following description of the present disclosure, certain detailed descriptions of the related art may be omitted when it is deemed that they may unnecessarily obscure the subject matters of the present disclosure.

For example, particular shapes, structures, and features described herein may be modified from some embodiments to other embodiments without departing from the spirit and scope of the present disclosure. Also, it will be understood that the position or arrangement of individual components in each embodiment may be modified without departing from the spirit and scope of the present disclosure. Thus, the following detailed description should be considered in a descriptive sense only and not for purposes of limitation, and the scope of the present disclosure should be construed as including the appended claims, and all equivalents thereof. That is, particular details described herein are merely examples. Particular embodiments may vary from these example details and may still be contemplated within the spirit and scope of the present disclosure, and equivalents thereof.

Although terms such as "first" and "second" may be used herein to describe various elements or components, these elements or components should not be limited by these terms. These terms are only used to distinguish one element or component from another element or component. Thus, a first element or component discussed below could be termed a second element or component, without departing from the spirit and scope of the inventive concept.

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, embodiments of the present disclosure will be described in more detail with reference to the accompanying drawings. In the following description, like reference numerals will be used to denote like elements, and redundant descriptions thereof may be omitted for conciseness.

Figure 1:
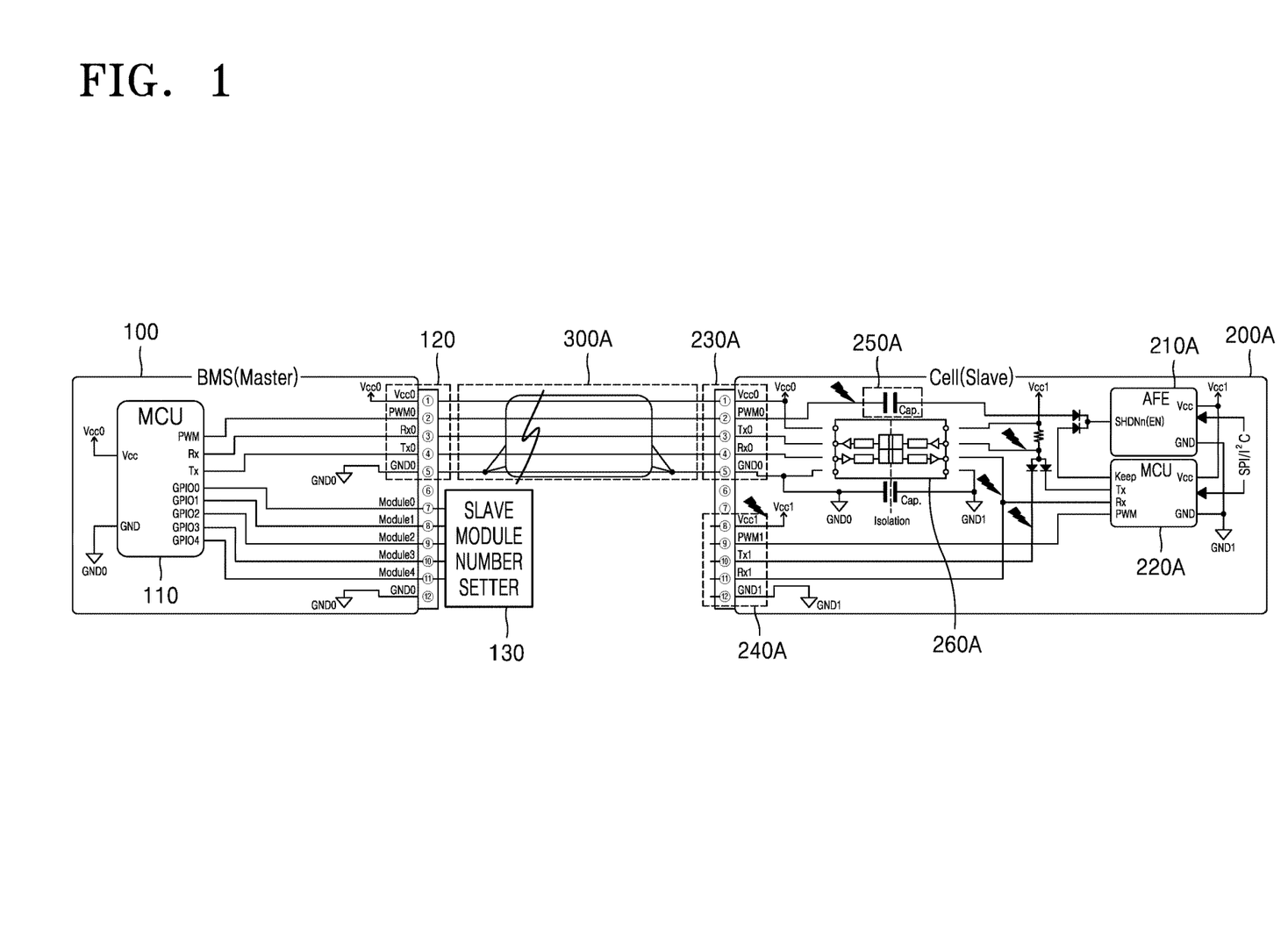
FIG. 1 is a diagram illustrating a master module and a first slave module from among a plurality of modules included in a battery module system according to an embodiment of the present disclosure.

FIG. 1 is a diagram illustrating only a master module 100 and a first slave module 200A from among a plurality of modules included in a battery module system according to an embodiment of the present disclosure.

The battery module system according to an embodiment of the present disclosure may include the master module 100 and at least one slave module including the first slave module 200A. For example, the battery module system may include one master module and 32 slave modules. In this case, the master module 100 and the at least one slave module may be connected in series, and an isolated communication may be performed between the modules.

The master module 100 according to an embodiment of the present disclosure may be a module for managing at least one slave module. For example, the master module 100 may allocate and manage an identification number of at least one slave module. Also, based on the allocated identification number, the master module 100 may receive data (e.g., state of charge (SOC), current, and voltage of each battery cell)

from at least one slave module and perform an operation on the data or transmit the data to an external device.

The master module 100 according to an embodiment of the present disclosure may include a first processor 110, a master terminal 120, and a slave module number setter 130.

The first processor 110 according to an embodiment of the present disclosure may be a unit for generating a first wake-up signal for waking up at least one slave module and for allocating and managing an identification number of at least one slave module. In this case, the first processor 110 may include any suitable type of device capable of processing data. For example, the first processor 110 may include a data processing device that is embedded in hardware and has a physically structured circuit to perform a function represented by the command or code in a program.

As an example, the data processing device embedded in hardware may include any processing device such as a microprocessor, a central processing unit (CPU), a processor core, a multiprocessor, an application-specific integrated circuit (ASIC), or a field programmable gate array (FPGA); however, the present disclosure is not limited thereto.

The first processor 110 according to an embodiment of the present disclosure may generate a first wake-up signal for waking up at least one slave module in the form of a pulse, and may output the first wake-up signal through the master terminal 120 described below. In this case, the width and/or period of the pulse may be variously set according to system requirements.

The master terminal 120 according to an embodiment of the present disclosure may include a terminal for connecting the master module 100 and the first slave module 200A connected to the master module 100 from among the at least one slave module.

As illustrated in FIG. 1, the master terminal 120 may include a terminal PWM0 for transmitting the first wake-up signal, a terminal Rx0 for receiving data, a terminal Tx0 for transmitting data, and power terminals Vcc0 and GND0.

The master terminal 120 according to an embodiment of the present disclosure may be connected through a shielded cable 300A to the first slave module 200A described below. In this case, the shielded cable 300A may include at least one shielding layer for protecting a signal to be transmitted against noise or the like caused by an external environment.

As such, according to an embodiment of the present disclosure, because the shielded cable 300A including at least one shielding layer is used in the inter-module connection, the isolated communication between the modules may be performed with higher reliability.

A slave module number setter 130 according to an embodiment of the present disclosure may be a unit for setting the number of slave modules included in the battery module system.

The number of slave modules included in the battery module system according to an embodiment of the present disclosure may be variable. For example, a system requiring high capacity and/or high power may include a relatively large number of slave modules. On the other hand, a system requiring low capacity and/or low power may include a relatively small number of slave modules. In each case, the user may operate the slave module number setter 130 to allow the first processor 110 to recognize the number of slave modules included in the system.

For example, the slave module number setter 130 may include a switch for setting the number of at least one slave module connected to the master module 100 by at least one bit. For example, the slave module number setter 130 may include a switch for suitably setting each of five bits.

However, such methods and/or the number of bits are merely examples, and the slave module number setter 130 of an embodiment of the present disclosure may include any unit that may receive a user input to allow the first processor 110 to recognize the number of slave modules included in the system.

The master module 100 may further include a memory for temporarily and/or permanently storing data processed by the first processor 110, a power supply unit for supplying power to the first processor 110, and a communicator for exchanging data with the external device.

The first slave module 200A according to an embodiment of the present disclosure may be a module for managing at least one cell connected to the first slave module 200A, in cooperation with the master module 100 described above. For example, the first slave module 200A may measure the physical quantity of at least one battery cell connected to the first slave module 200A, analyze (or process) the measurement result, and/or transmit the measurement result to the master module 100.

Also, the first slave module 200A may be woken up according to the first wake-up signal transmitted by the master module 100 and may set its own identification number according to the identification number allocated by the master module 100.

Meanwhile, as described above, the first slave module 200A may include a slave module connected to the master module 100 from among the at least one slave module.

The first slave module 200A according to an embodiment of the present disclosure may include an analog front end (AFE) 210A, a second processor 220A, a first slave terminal 230A, a second slave terminal 240A, a first communication isolator 250A, and a second communication isolator 260A.

The AFE 210A according to an embodiment of the present disclosure may include a unit that may be woken up by receiving the first wake-up signal transmitted by the master module 100 and may measure at least one physical quantity of the first slave module 200A and transmit the measurement result to the second processor 220A.

The AFE 210A may include a first terminal SHDNn(EN) for receiving the first wake-up signal and a second terminal Vcc for outputting a first voltage in a wake-up state. The first terminal SHDNn(EN) may be electrically connected to a terminal PWM0 of the first slave terminal 230A and a third terminal Keep of the second processor 220A, and the second terminal Vcc may be electrically connected to a fourth terminal Vcc of the second processor 220A.

The AFE 210A according to an embodiment of the present disclosure may be woken up from a standby state by receiving the first wake-up signal generated by the master module 100 in the form of a pulse through the first terminal SHDNn(EN) and may wake up the second processor 220A in a standby mode by using the second terminal Vcc.

Also, the AFE 210A may measure physical quantities (e.g., physical properties of a material that can be quantified by measurement) such as the voltage, current, temperature, state of charge (SOC), and a balancing amount of the battery cell connected to the first slave module 200A and may transmit the measurement results to the second processor 220A.

In this case, the AFE 210A and the second processor 220A may exchange data according to a Serial Peripheral Interconnect (SPI) communication method or an Inter-Integrated Circuit (I2C) communication method. However, such communication methods are merely examples, and embodiments of the present disclosure are not limited thereto.

The second processor 220A according to an embodiment of the present disclosure may include a unit for receiving and processing a signal transmitted by the first processor 110 of the master module 100, for transmitting a signal to the first processor 110, and for processing the physical quantity measured by the AFE 210A.

For example, the second processor 220A according to an embodiment of the present disclosure may transmit the measured physical quantity to the master module 100 in response to a physical quantity request signal of the first processor 110 or at a preset time period.

In this case, like the first processor 110, the second processor 220A may include any type of device capable of processing data. For example, the second processor 220A may include a data processing device that is embedded in hardware and has a physically structured circuit to perform a function represented by the command or code in a program.

As an example, the data processing device embedded in hardware may include any processing device such as a microprocessor, a central processing unit (CPU), a processor core, a multiprocessor, an application-specific integrated circuit (ASIC), or a field programmable gate array (FPGA); however, embodiments of the present disclosure are not limited thereto.

After being woken up based on the first wake-up signal received from the master module 100, the second processor 220A according to an embodiment of the present disclosure may generate a second wake-up signal for waking up a subsequent slave module relative to the first slave module and may output the second wake-up signal through the second slave terminal 240A.

The second processor 220A according to an embodiment of the present disclosure may include a third terminal Keep electrically connected to the first terminal SHDNn(EN) of the AFE 210A and a fourth terminal Vcc electrically connected to the second terminal Vcc of the AFE 210A. Also, the second processor 220A may include a fifth terminal PWM for outputting the second wake-up signal.

In some related arts, the AFE and the second processor may be implemented as an integrated processor, and the remaining portion of the first slave module may be designed in accordance with the integrated processor. In other related arts, the AFE and the second processor may be separately implemented, but a communication port and/or a communication method according to their own standards may be used to make a design according to the AFE and the second processor of a particular model.

The first slave module 200A according to an embodiment of the present disclosure illustrated in FIG. 1 may not be dependent on the AFE 210A and the second processor 220A of a particular manufacturer by using the general-purpose communication method and the communication terminal of the second processor 220A and the AFE 210A that are generally used.

The first slave terminal 230A according to an embodiment of the present disclosure may include a terminal for connecting the first slave module 200A to the master module 100. As illustrated in FIG. 1, the first slave terminal 230A may include a terminal PWM0 for receiving the first wake-up signal, a terminal Rx for receiving data, a terminal Tx for transmitting data, and power terminals Vcc0 and GND0.

Similarly, the second slave terminal 240A may include a terminal for connecting the first slave module 200A to an adjacent subsequent slave module. As illustrated in FIG. 1, the second slave terminal 240A may include a terminal PWM1 for transmitting the second wake-up signal, a terminal Rx1 for receiving data, a terminal Tx1 for transmitting data, and power terminals Vcc1 and GND1.

A first communication isolator 250A according to an embodiment of the present disclosure may include a unit that may be arranged on a first communication line to isolate the communication between the first slave terminal 230A and the AFE 210A. In this case, the first communication line may be a communication line connecting the first slave terminal 230A to the AFE 210A and may be a line for transmitting the first wake-up signal (e.g., pulse signal) generated by the first processor 110 to the AFE 210A (i.e., a line connecting the terminal PWM0 of the first slave terminal 230A to the first terminal SHDNn(EN) of the AFE 210A).

For example, the first communication isolator 250A according to an embodiment of the present disclosure illustrated in FIG. 1 may include at least one capacitor arranged on the first communication line, as an isolation unit. However, the isolation unit is merely an example, and embodiments of the present disclosure are not limited thereto.

As such, embodiments of the present disclosure may implement a more accurate wake-up operation by providing an isolation unit on a communication line for transmitting a wake-up signal.

A second communication isolator 260A according to an embodiment of the present disclosure may include a unit that may be arranged on a second communication line to isolate (e.g., in one embodiment, isolated communication refers to isolating functional sections of electrical systems to prevent direct current flow) the communication between the first slave terminal 230A and the second processor 220A.

In this case, the second communication line may be a communication line connecting the first slave terminal 230A to the second processor 220A and may be a line for transmitting a signal generated by the first processor 110 to the second processor 220A or transmitting a signal generated by at least one of a subsequent slave module and the second processor 220A to the first processor 110 (i.e., a communication line connecting the terminals Rx0 and Tx0 of the first slave terminal 230A and the terminals Rx and Tx of the second processor 220A).

In other words, the second communication line may include a (2-1)th communication line for transmitting a signal generated by the first processor 110 to the second processor 220A and a (2-2)th communication line for transmitting a signal generated by at least one of a subsequent slave module and the second processor 220A to the first processor 110.

The second communication isolator 260A according to an embodiment of the present disclosure may include a high-frequency transformer arranged on each of the (2-1)th communication line and the (2-2)th communication line, as the isolation unit. However, the isolation unit is merely an example, and embodiments of the present disclosure are not limited thereto.

The first slave module 200A according to an embodiment of the present disclosure may further include a third communication line and a fourth communication line in addition to the first communication line and the second communication line. In this case, the third communication line may be a line connecting the second slave terminal 240A to the second processor 220A and transmitting the second wake-up signal generated by the second processor 220A to an adjacent subsequent slave module through the second slave terminal 240A (i.e., a line connecting the fifth terminal PWM of the second processor 220A to the terminal PWM1 of the second slave terminal 240A in FIG. 1).

Also, the fourth communication line may include a line for receiving a signal from an adjacent subsequent module or transmitting a signal received from an adjacent previous module to an adjacent subsequent module (e.g., a line connecting the terminals Rx and Tx of the second processor 220A to the terminals Rx1 and Tx1 of the second slave terminal 240A in FIG. 1).

Figure 2:
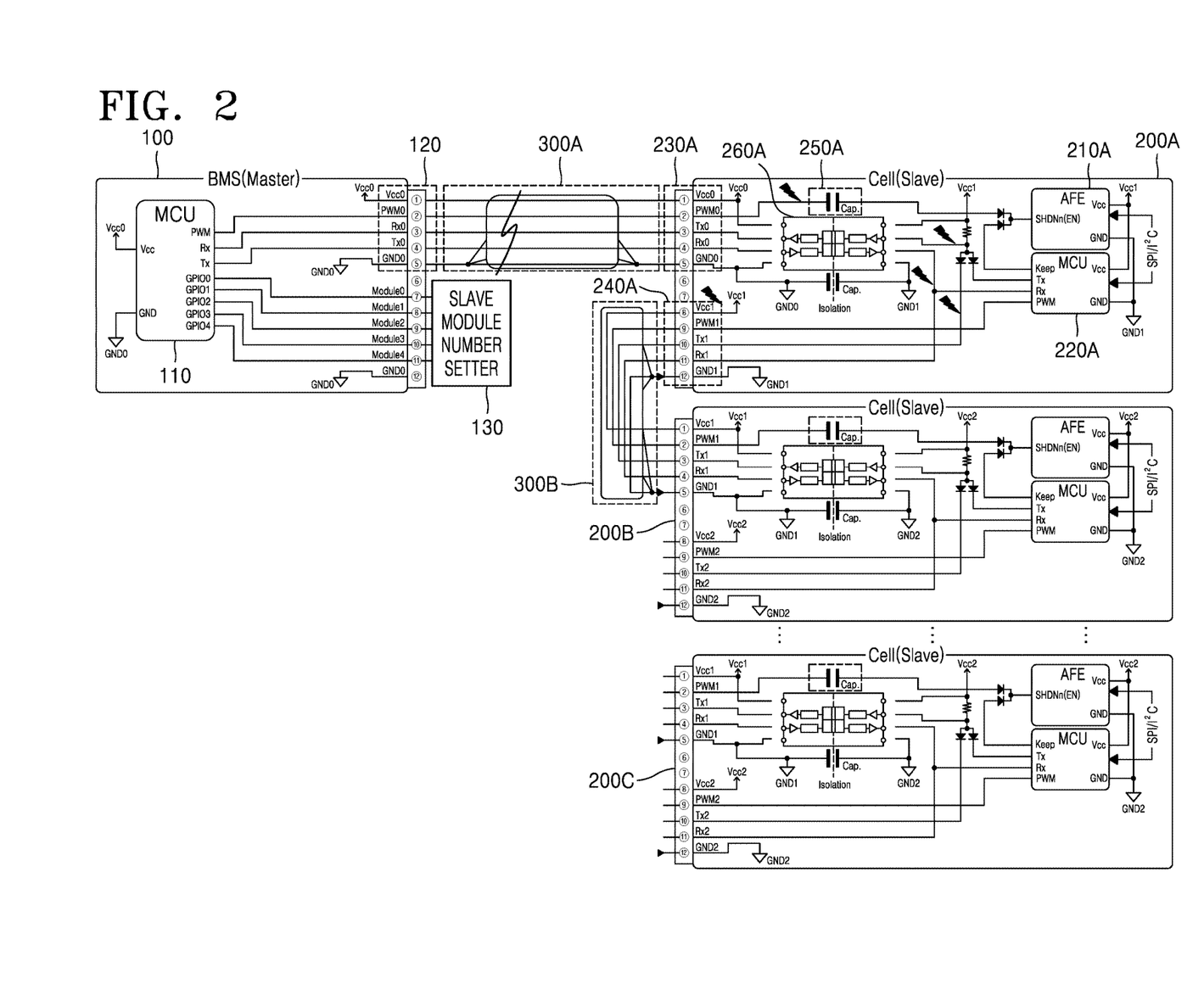
FIG. 2 is a diagram illustrating a battery module system including a plurality of slave modules.

FIG. 2 is a diagram illustrating a battery module system including a plurality of slave modules.

As illustrated in FIG. 2, the battery module system according to an embodiment of the present disclosure may include a master module 100 and a plurality of slave modules, (e.g., first, second, and third slave modules 200A, 200B, and 200C). In this case, the master module 100 and the first, second, and third slave modules 200A, 200B, and 200C may be connected in series as illustrated in FIG. 2.

Because the master module 100 and the first slave module 200A have been described above in more detail with reference to FIG. 1, redundant descriptions thereof may be omitted for conciseness.

Also, because the second and third slave modules 200B and 200C have substantially the same configuration as the first slave module 200A except for the inter-module connection relationship, redundant descriptions of the configuration of the second and third slave modules 200B and 200C may be omitted for conciseness.

Meanwhile, as in the connection between the master module 100 and the first slave module 200A, a shielded cable 300B may be used for the connection between the first slave module 200A and the second slave module 200B.

In this case, as described above, the shielded cable 300B may include at least one shielding layer for protecting a signal to be transmitted against noise or the like caused by an external environment. Similarly, a shielded cable may be used for connection between the serially-connected slave modules.

As such, according to an embodiment of the present disclosure, because the shielded cable 300A or 300B including at least one shielding layer is used in the inter-module connection, the isolated communication between the modules may be performed with higher reliability.

Figure 3:
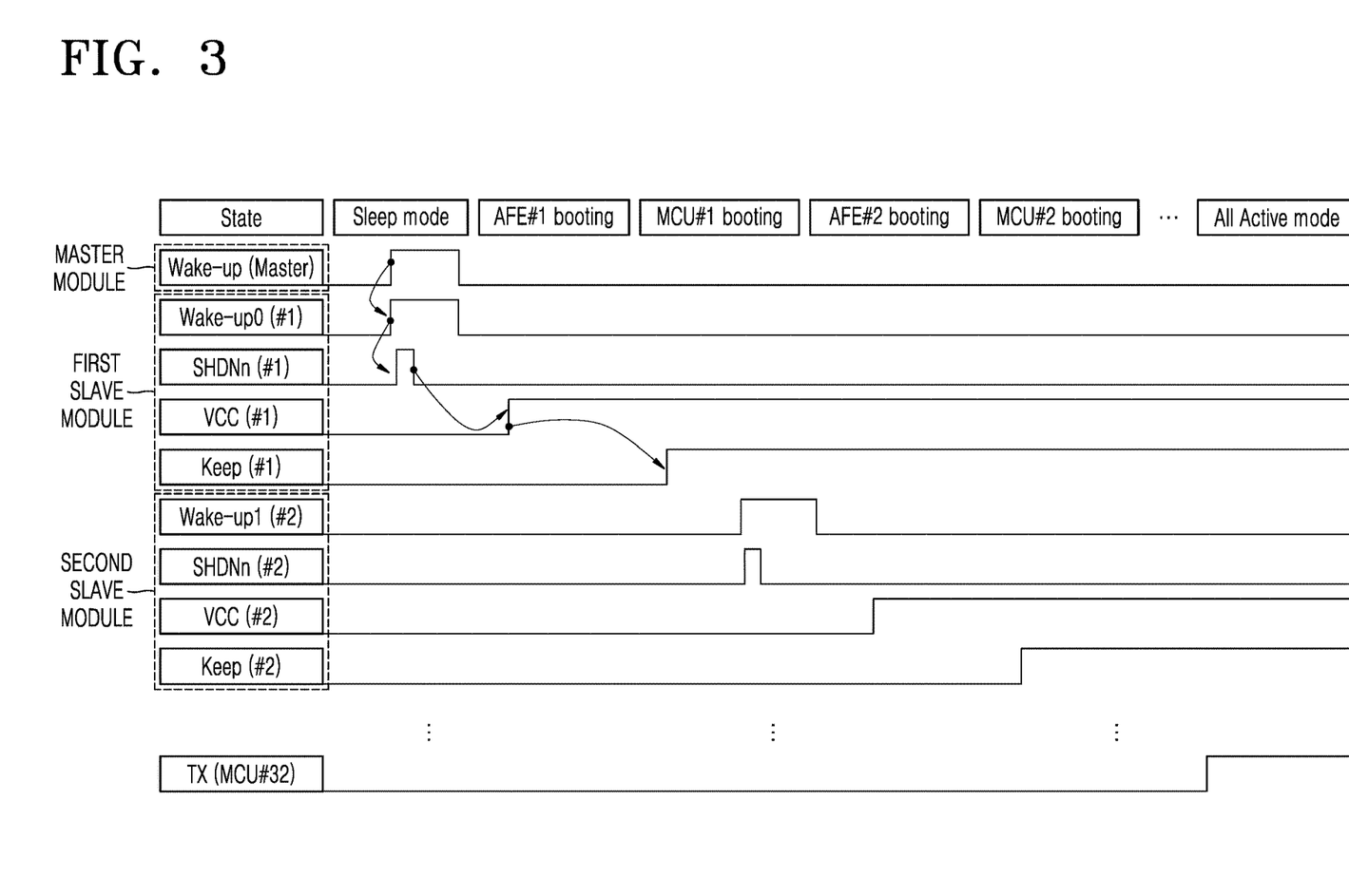
FIG. 3 is a diagram illustrating voltages over time of each terminal to describe a process of waking up a battery module system according to an embodiment of the present disclosure.

FIG. 3 is a diagram illustrating voltages over time of each terminal to describe a process of waking up a battery module system according to an embodiment of the present disclosure. For convenience of description, it is assumed that the first slave module 200A is a module serving as a reference for description, the adjacent previous module is the master module 100, and the adjacent subsequent module is the second slave module 200B. Also, it is assumed that a first wake-up signal (Wake-up (Master)) illustrated in FIG. 3 is generated by the master module 100 and transmitted to the first slave module 200A.

Assuming as above, a signal having the same waveform as the first wake-up signal may be applied to the first terminal SHDNn(EN) of the AFE 210A according to an embodiment of the present disclosure.

As described above, because the AFE 210A outputs the first voltage through the second terminal Vcc in the wake-up state, the second terminal Vcc may output the first voltage after the first wake-up signal is applied to the first terminal SHDNn(EN). Also, the AFE 210A according to an embodiment of the present disclosure may maintain the output of the first voltage in the wake-up state as illustrated in FIG. 3.

The second processor 220A according to an embodiment of the present disclosure may be booted when the first voltage is applied to the fourth terminal Vcc electrically connected to the second terminal Vcc of the AFE 210A.

Also, after the second processor 220A is booted, a second voltage may be output to the third terminal Keep and the second wake-up signal may be output to the fifth terminal PWM.

The second processor 220A according to an embodiment of the present disclosure may maintain the output of the second voltage to the third terminal Keep while the application of the first voltage applied to the fourth terminal Vcc is maintained. That is, the second processor 220A may maintain the output of the second voltage to the third terminal Keep such that the wake-up state of the AFE 210A may maintain the wake-up state.

In other words, when at least one of the first wake-up signal and the second voltage is applied to the first terminal SHDNn(EN), the AFE 210A according to an embodiment of the present disclosure may maintain the wake-up state such that the second processor 220A may maintain an operation state.

The second wake-up signal output to the fifth terminal PWM of the second processor 220A may wake up the subsequent slave module, that is, the second slave module 200B, and the other slave modules in the same way as described above.

Meanwhile, after the booting is completed, the second processor 220A may generate a signal corresponding to booting completion and transmit the generated signal to the master module 100 through the second communication line.

Based on the number of signals received corresponding to the booting completion, the master module 100 may determine whether the wake-up of all slave modules is completed.

According to an embodiment of the present disclosure, in the battery system including a plurality of slave modules, all of the slave modules may be woken up by the wake-up signal propagation between the slave modules.

Particular implementations described herein are merely embodiments, and do not limit the scope of the present disclosure in any way. For the sake of conciseness, descriptions of related art electronic configurations, control systems, software, and other functional aspects of the systems may be omitted. Also, the connection lines or connection members between various components illustrated in the drawings represent examples of functional connections and/or physical or logical connections between the various components, and various suitable alternative or additional functional connections, physical connections, or logical connections may be present in practical apparatuses. Also, no element may be essential to the practice of the present disclosure unless the element is specifically described as "essential" or "critical".

Thus, the spirit of the present disclosure is not limited to the above embodiments, and the scope of the present disclosure may include both the following claims and the equivalents thereof.

While one or more embodiments have been described with reference to the figures, it will be understood by those of ordinary skill in the art that various changes in form and details may be made therein without departing from the spirit and scope as defined by the following claims, and equivalents thereof.

What is claimed is:

1. A slave module configured to receive a first wake-up signal from an adjacent previous module to perform a wake-up operation and to transmit a second wake-up signal to an adjacent subsequent module, the slave module comprising:

an analog front end (AFE) comprising a first terminal and a second terminal, the AFE being configured to be woken up by receiving the first wake-up signal through the first terminal and to output a first voltage through the second terminal in a woken up state;

a processor comprising a third terminal electrically connected to the first terminal, a fourth terminal electrically connected to the second terminal, and a fifth terminal electrically connected to a second slave terminal, the processor being configured to boot up when the first voltage is applied to the fourth terminal, to output a second voltage to the third terminal after being booted up, and to output the second wake-up signal to the fifth terminal;

a first slave terminal connecting the adjacent previous module to the slave module;

the second slave terminal connecting the adjacent subsequent module to the slave module;

a first communication line connecting the first slave terminal to the AFE and configured to transmit the first wake-up signal received from the adjacent previous module to the AFE; and a third communication line connecting the second slave terminal to the processor and configured to transmit the second wake-up signal generated by the processor to the adjacent subsequent module through the second slave terminal.

2. The slave module of claim 1, wherein the AFE maintains the output of the first voltage through the second terminal in the woken up state.

3. The slave module of claim 2, wherein the processor is configured to maintain the output of the second voltage to the third terminal when an application of the first voltage to the fourth terminal is maintained.

4. The slave module of claim 3, wherein the AFE is configured to maintain the woken up state when at least one selected from the first wake-up signal and the second voltage is applied to the first terminal.

5. The slave module of claim 1, further comprising a second communication line configured to transmit a signal generated by the adjacent previous module to the processor or to transmit a signal received from the adjacent subsequent module to the adjacent previous module.

6. The slave module of claim 5, wherein the second communication line comprises:

a (2-1)th communication line configured to transmit the signal generated by the adjacent previous module to the processor; and a (2-2)th communication line configured to transmit the signal received from the adjacent subsequent module to the adjacent previous module.

7. The slave module of claim 6, further comprising a second communication isolator arranged on the second communication line, wherein the second communication isolator comprises a high-frequency transformer arranged on the (2-1)th communication line and the (2-2)th communication line.

8. The slave module of claim 5, wherein the processor is configured to generate, after being booted, a signal corresponding to booting completion and to transmit the signal to a master module through the second communication line.

9. The slave module of claim 1, wherein the first wake-up signal and the second wake-up signal comprise a pulse.

10. The slave module of claim 1, wherein the adjacent previous module comprises a master module, and wherein the master module is configured to generate the first wake-up signal.

11. The slave module of claim 10, wherein the master module and the slave module are electrically connected through the first slave terminal by a shielded cable comprising a shielding layer.

12. The slave module of claim 1, wherein the adjacent subsequent module comprises a subsequent slave module, and wherein the processor is configured to generate the second wake-up signal and to transmit the second wake-up signal to the subsequent slave module to wake up the subsequent slave module.

13. The slave module of claim 12, wherein the slave module and the subsequent slave module are electrically connected through the second slave terminal by a shielded cable comprising a shielding layer.

14. The slave module of claim 1, further comprising a first communication isolator arranged on the first communication line.

15. The slave module of claim 14, wherein the first communication isolator comprises a capacitor arranged on the first communication line.

16. The slave module of claim 1, further comprising a fourth communication line configured to receive a signal from the adjacent subsequent module or configured to transmit a signal received from the adjacent previous module to the adjacent subsequent module.

* * * * *